United States Patent
Ikeda et al.

(10) Patent No.: US 8,933,338 B2
(45) Date of Patent: Jan. 13, 2015

(54) TERMINAL BLOCK FOR VEHICLE-MOUNTED BATTERY ASSEMBLY

(75) Inventors: Tomohiro Ikeda, Kakegawa (JP); Ryuta Takishita, Kakegawa (JP); Yukihisa Kikuchi, Kakegawa (JP); Masaru Imai, Kakegawa (JP); Keizo Aoki, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 93 days.

(21) Appl. No.: 13/612,027

(22) Filed: Sep. 12, 2012

(65) Prior Publication Data
US 2013/0062098 A1  Mar. 14, 2013

(30) Foreign Application Priority Data

Sep. 13, 2011  (JP) .................................. 2011-199538

(51) Int. Cl.
*H01M 2/30* (2006.01)
(52) U.S. Cl.
CPC .......... *H01M 2/305* (2013.01); *H01M 2220/20* (2013.01)
USPC ...................................................... 174/138 F
(58) Field of Classification Search
CPC ....................................................... H02G 3/08
USPC ...................................................... 174/138 F
See application file for complete search history.

(56) References Cited

U.S. PATENT DOCUMENTS

| | | | | |
|---|---|---|---|---|
| 5,576,516 | A * | 11/1996 | Kameyama et al. | 174/138 F |
| 6,426,465 | B1 * | 7/2002 | Kosuge | 174/138 F |
| 6,461,171 | B2 * | 10/2002 | Kanaoka et al. | 439/76.2 |
| 6,576,838 | B2 * | 6/2003 | Matsumura | 174/66 |
| 2001/0046793 | A1 | 11/2001 | Kanaoka et al. | |
| 2002/0134572 | A1 | 9/2002 | Matsumura | |

FOREIGN PATENT DOCUMENTS

| | | | |
|---|---|---|---|
| JP | 2003-157828 A | | 5/2003 |
| JP | 2004056968 A | * | 2/2004 |

OTHER PUBLICATIONS

Office Action dated Jun. 3, 2014, issued by the State Intellectual Property Office of the People's Republic of China in counterpart Chinese Application No. 201210339266.X.

* cited by examiner

*Primary Examiner* — Timothy Thompson
*Assistant Examiner* — Krystal Robinson
(74) *Attorney, Agent, or Firm* — Sughrue Mion, PLLC

(57) ABSTRACT

A terminal block for a vehicle-mounted battery assembly, the terminal block being attached to a total positive/negative terminal block which is attached to the vehicle-mounted battery assembly. An external extraction positive-side fastening portion and an external extraction negative-side fastening portion are positioned at different heights. A terminal cover is configured to cover the external extraction positive-side fastening portion. The terminal cover includes a fitting portion fitted into the terminal block for the vehicle-mounted battery assembly, a hinge portion engaged with the fitted portion, an arm portion engaged with the hinge portion, and a cover body engaged with the arm portion. The arm portion has a predetermined length, so that by hinge operation of the hinge portion, the cover body covers both the external extraction positive-side fastening portion and the external extraction negative-side fastening portion which are positioned at different heights.

5 Claims, 8 Drawing Sheets

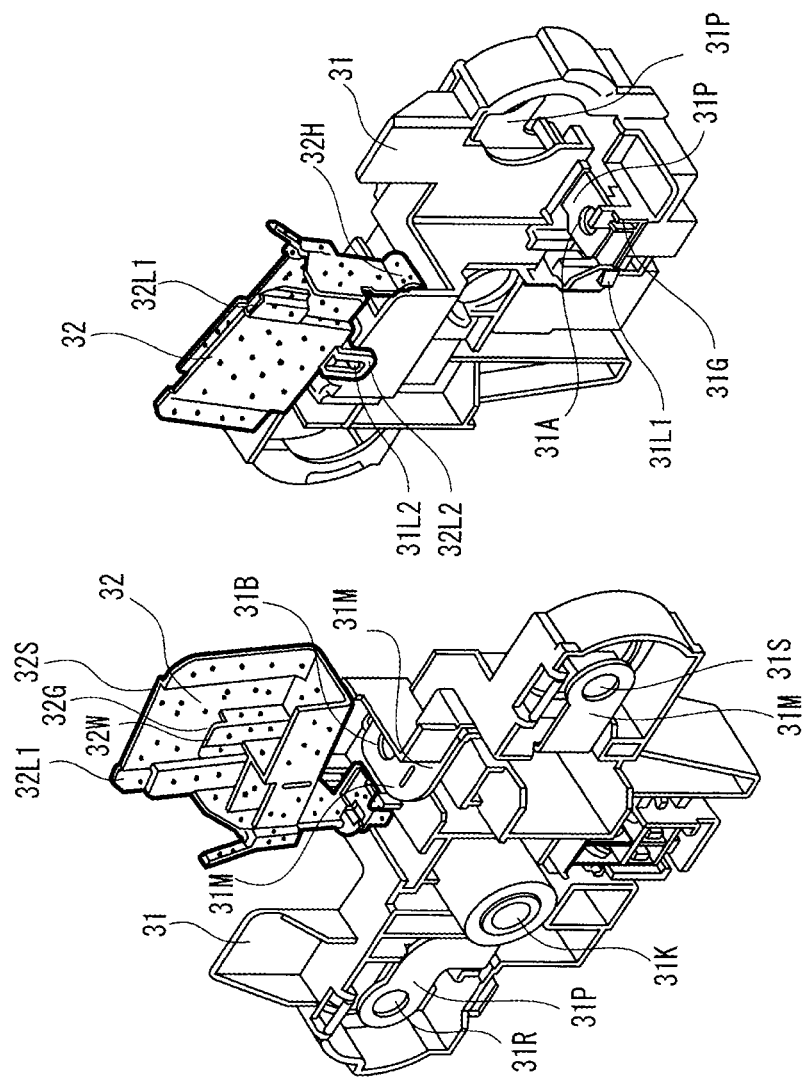

US 8,933,338 B2

TERMINAL BLOCK FOR VEHICLE-MOUNTED BATTERY ASSEMBLY

CROSS-REFERENCE TO RELATED APPLICATIONS

This application claims the priority of Application No. JP 2011-199538 filed Sep. 13, 2011, in the Japanese Patent Office (JPO), the disclosures of which are incorporated herein in their entirety.

The disclosure of Japanese Patent Application No. 2011-199538 filed on Sep. 13, 2011, including specification, drawings and claims is incorporated herein by reference in its entirety.

TECHNICAL FIELD

The present invention relates to a terminal block for a vehicle-mounted battery assembly. More specifically, the present invention relates to a terminal block including a short-circuit preventing measure to prevent positive and negative terminals from being short-circuited due to the fact that both terminals are simultaneously brought into contact with each other by a tool or the like when bolts are fastened to the terminal block.

BACKGROUND

A vehicle-mounted battery assembly is provided with a negative terminal and a positive terminal which protrude from the assembly. Electric cables are connected to the negative terminal and the positive terminal, respectively, by fastening bolts to ring-type connection metal fittings in the state in which the connection metal fittings are fixed to ends of the electric cable by a standoff or the like and are respectively engaged with the negative terminal and the positive terminal. In the case where a distance between the terminals of the battery is short, the tool may be brought into contact with both negative and positive terminals to cause a short circuit in the terminals when the electric cables are connected to the terminals.

A terminal block including a structure for preventing the short circuit is disclosed in Patent Document 1.

Patent Document 1: Japanese Patent Application Publication No. 2003-157828A (Patent Disclosed in Patent Document 1)

The patent disclosed in Patent Document 1 includes a cover which is slid between the positive terminal and the negative terminal in the battery. In the case of performing the operation of connecting the electric cable to one terminal, the cover is slid to the opposite terminal, so that the terminal is opened while the opposite terminal is covered. As a result, the positive terminal and the negative terminal are not simultaneously exposed, thereby preventing the positive and negative terminals from being short-circuited due to the fact that the tool is brought into contact with both positive and negative terminals when the electric cable is connected to the terminals, (Problem of the Patent Disclosed in Patent Document 1)

In the patent disclosed in Patent Document 1, since the cover is slid between the positive terminal and the negative terminal, it is difficult to apply the patent in the case where there is a stepped portion between the positive terminal and the negative terminal of the battery, or there is no space for attaching the slide cover.

Also, in addition to the cover for covering the terminals, since a slide cover for restricting opening and closing is required, the number of components is increased.

SUMMARY

It is thereof an object of the present invention is to provide a terminal block for a vehicle-mounted battery assembly capable of being applied to a case where there is a stepped portion between a positive terminal and a negative terminal, or there is no space for attaching a slide cover, reducing the number of components, and eliminating a concern about a short circuit which occurs between the positive terminal and the negative terminal of the battery via a tool when the terminals are fastened.

(1) According to an aspect of the embodiments of the present invention, there is provided a terminal block for a vehicle-mounted battery assembly, the terminal block being attached to a total positive/negative terminal block which is attached to the vehicle-mounted battery assembly, the terminal block comprising: an external extraction positive-side fastening portion and an external extraction negative-side fastening portion which are positioned at different heights; and a terminal cover configured to cover the external extraction positive-side fastening portion, wherein the terminal cover includes a fitting portion fitted into the terminal block for the vehicle-mounted battery assembly, a hinge portion engaged with the fitted portion, an arm portion engaged with the hinge portion, and a cover body engaged with the arm portion, and the arm portion has a predetermined length, so that by hinge operation of the hinge portion, the cover body covers both the external extraction positive-side fastening portion and the external extraction negative-side fastening portion which are positioned at different heights.

With this configuration, even though there is a height difference between the external extraction positive-side fastening portion and the external extraction negative-side fastening portion, the height difference of both fastening portions is solved by the arm portion. Since the terminal cover completely covers the fastening portion at a position of one side, and covers the right top of the fastening portion, both fastening portions are not simultaneously exposed. Therefore, there is no concern in which the positive and negative terminals are brought into contact with each other by a tool at the fastening work, so that the terminals are short-circuited.

(2) The terminal block for the vehicle-mounted battery assembly and the terminal cover may be respectively provided with a first lock function for locking the terminal cover in a state in which the terminal cover covers the external extraction positive-side fastening portion, and a second lock function for locking the terminal cover in a state in which the terminal cover covers the external extraction negative-side fastening portion.

With this configuration, even in the state in which the terminal cover is closed or opened, the terminal cover can be reliably maintained in the state.

(3) The terminal block for the vehicle-mounted battery assembly and the terminal cover may be respectively provided with a rattling prevention function of preventing rattling of the terminal cover in a state in which the terminal cover covers the external extraction positive-side fastening portion.

With this configuration, in the state in which the terminal cover is closed, the terminal cover is not rattled, so that the terminal block can be reliably used.

BRIEF DESCRIPTION OF THE DRAWINGS

In the accompanying drawings:

FIGS. 1A and 1B are diagrams illustrating a state in which a terminal cover according to the present invention is removed from a terminal block for a vehicle-mounted battery assembly to which the present invention is applied, in which FIG. 1A is a plan view, and FIG. 1B is a front view.

FIG. 5A is a perspective view when seen from a direction indicated by the arrow 5A in FIG. 4A, FIG. 5B is a perspective view when seen from a direction indicated by the arrow 5B in FIG. 4A, and FIG. 5C is a perspective view when seen from a direction indicated by the arrow 5C in FIG. 4A.

DETAILED DESCRIPTION OF THE EMBODIMENTS

Hereinafter, a terminal block for a vehicle-mounted battery assembly capable of being applied to a case where there is a stepped portion between a positive terminal and a negative terminal, or there is no space for attaching a slide cover, reducing the number of components, and eliminating a concern about a short circuit which occurs between the positive terminal and the negative terminal of the battery via a tool when the terminals are fastened will now be described with reference to FIGS. 1A to 7.

(Vehicle-Mounted Battery Assembly Equipped with Terminal Block of the Present Invention)

Figure 8A:
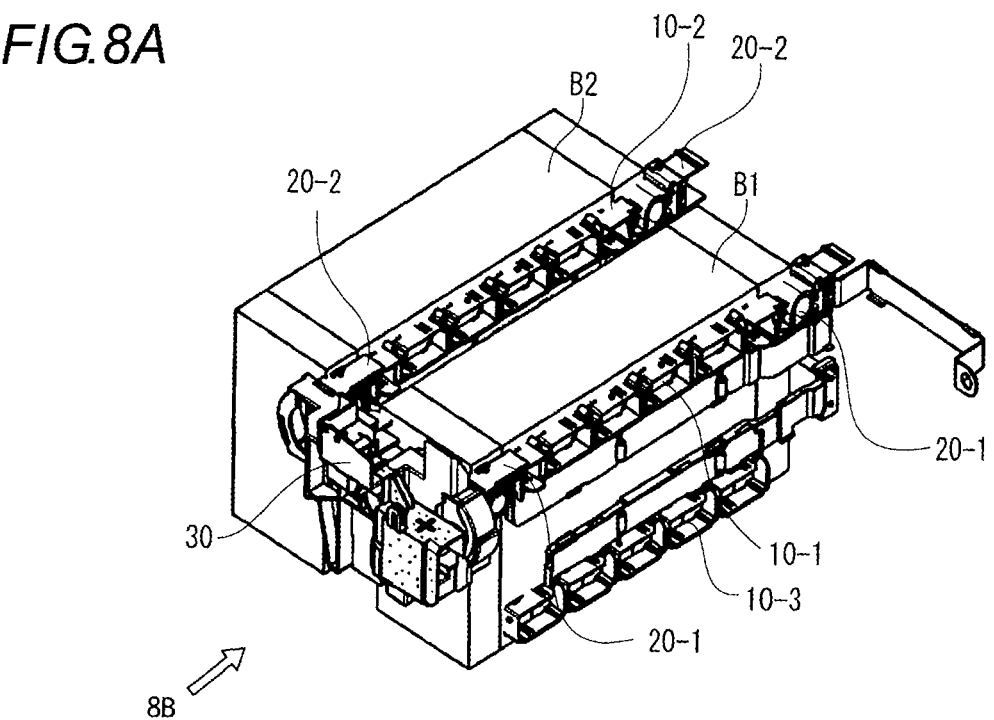
FIG. 8A is a perspective view illustrating the terminal block in FIG. 3B which is assembled and mounted to a vehicle-mounted battery assembly.
Figure 8B:
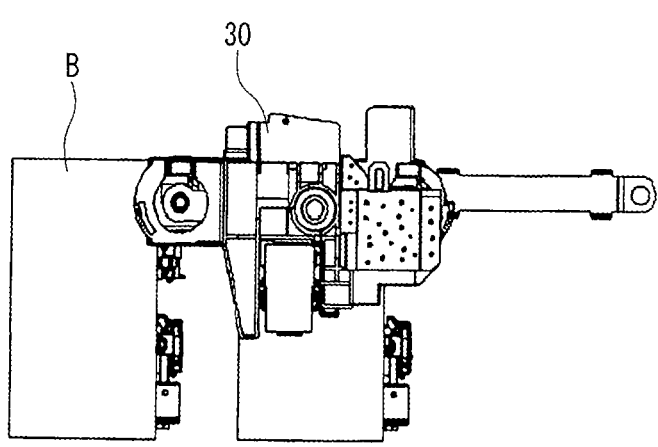
FIG. 8B is a front view when seen from a direction indicated by the arrow 8B in FIG. 8A.

FIG. 8A is a diagram illustrating one example of a vehicle-mounted battery assembly equipped with a terminal block of the present invention, in which FIG. 8A is a perspective view illustrating the terminal block according to the present invention which is assembled and mounted to the vehicle-mounted battery assembly, and FIG. 8B is a front view when seen from a direction indicated by the arrow 8B in FIG. 8A.

In FIG. 8A, reference numerals B1 and B2 denote two vehicle-mounted battery assemblies, 10-1 and 10-3 denote bus bar plate body for connecting in series all battery terminals of the vehicle-mounted battery assembly B1, 20-1 denotes a total positive/negative terminal block built with a bus bar connected in series to the bus bar plate body to transmit a high voltage obtained from the bus bar plate body to a terminal block 30 for the vehicle-mounted battery assembly, 30 denotes the terminal block for the vehicle-mounted battery assembly according to the present invention.

Now, the vehicle-mounted battery assemblies B1 and B2, the bus bar plate bodies 10-1 and 10-3, and the total positive/negative terminal block 20-1 will be described.

(Vehicle-Mounted Battery Assembly B)

The vehicle-mounted battery assembly B1 includes a plurality (10 in this embodiment) of batteries arranged in a horizontal direction, in which two terminals of the respective batteries become a top and a bottom. In this instance, for example, the first battery (at the side of the terminal block 30 for the vehicle-mounted battery assembly) is arranged so that the negative terminal becomes the top, while the positive terminal becomes the bottom. The second battery adjacent to the first battery is arranged so that the positive terminal becomes the top, while the negative terminal becomes the bottom. The third battery adjacent to the second battery is arranged so that the negative terminal becomes the top, while the positive terminal becomes the bottom. In this way, 10 batteries in total are arranged and attached in parallel with each other in such a way that polarities of the terminals are alternated.

In the same way as the vehicle-mounted battery assembly B1, the vehicle-mounted battery assembly B2 is configured as follows: the first battery (at the side of the terminal block 30 for the vehicle-mounted battery assembly) is arranged so that the negative terminal becomes the top, while the positive terminal becomes the bottom; the second battery adjacent to the first battery is arranged so that the positive terminal becomes the top, while the negative terminal becomes the bottom; and the third battery adjacent to the second battery is arranged so that the negative terminal becomes the top, while the positive terminal becomes the bottom. In this way, 10 batteries in total are arranged and attached in parallel with each other in such a way that polarities of the terminals are alternated.

(Bus Bar Plate Bodies 10-1 and 10-3)

The bus bar plate body 10-1 is a device for connecting two adjacent terminals of 10 terminals of the upper row of the vehicle-mounted battery assembly B1 consisting of 10 batteries arranged in parallel with each other, using a conductive metal plate (bus bar). The bus bar plate body 10-3 is a device for connecting two adjacent terminals of 10 terminals of the lower row of the vehicle-mounted battery assembly B1 consisting of 10 batteries arranged in parallel with each other, using a conductive metal plate (bus bar). The ten batteries are connected in series to each other using the bus bar plate bodies 10-1 and 10-3, so that the respective voltages of the 10 batteries is connected in series to each other between the positive terminals (total positive terminals) and the negative terminals (total negative terminals) of the opposite end of the bus bar plate bodies 10-1 and 10-3 at the side of the terminal block 30 for the vehicle-mounted battery assembly, thereby obtaining a high voltage.

In the same way, the respective voltages of the ten batteries of the vehicle-mounted battery assembly B2 is connected in series to each other between the bus bar plate body 10-2 and the bus bar plate body 10-4 (not illustrated) positioned under the bus bar plate body 10-2, so that the respective voltages of the 10 batteries is connected in series to each other between the negative terminals (total negative terminals) and the positive terminals (total positive terminals) of the opposite end of the bus bar plate bodies 10-2 and 10-4 at the side of the terminal block 30 for the vehicle-mounted battery assembly, thereby obtaining a high voltage.

And, since the total negative terminals of the opposite bus bar plate bodies 10-1 and 10-3 and the total positive terminals of the bus bar plate bodies 10-2 and 10-4 are connected to each other by the bus bar, the high voltage generated from the series connection of the total voltage of the vehicle-mounted battery assemblies B1 and B2 is obtained between the total positive terminals of the bus bar plate bodies 10-1 and 10-3 at the side of the terminal block 30 for the vehicle-mounted battery assembly, and the total negative terminals of the bus bar plate bodies 10-2 and 10-4.

(Total Positive/Negative Terminal Blocks 20-1 and 20-2)

The bus bar is embedded in the total positive/negative terminal block 20-1, in which one end of the bus bar is fastened to the total positive terminals of the bus bar plate bodies 10-1 and 10-3, and the other end is fastened to a positive-side through-hole 31R of the positive bus bar 31P (FIG. 1B) in the terminal block 30 for the vehicle-mounted battery assembly. The total positive/negative terminal block 20-1 is made of a material having higher strength than that of the material of the bus bar plate bodies 10-1 and 10-3, thereby withstanding large fastening torque of the total positive/negative terminal block. Also, since the bus bar plate bodies 10-1 and 10-3 are made from a soft material, the bus bar plate bodies can have a large hinge function. As the bus bar plate bodies are segmented in plural in a longitudinal direction, and the segments are connected to each other by a hinge, it is possible to absorb a clearance of the batteries to the bus bar plate.

Also, the bus bar is embedded in the total positive/negative terminal block 20-2, in which one end of the bus bar is fastened to the total negative terminals of the bus bar plate bodies 10-2 and 10-4, and the other end is fastened to a negative-side through-hole 31S of the negative bus bar 31M (FIG. 1B) in the terminal block 30 for the vehicle-mounted battery assembly.

(Terminal Block 30 for Vehicle-Mounted Battery Assembly According to the Present Invention)

Figure 1A:
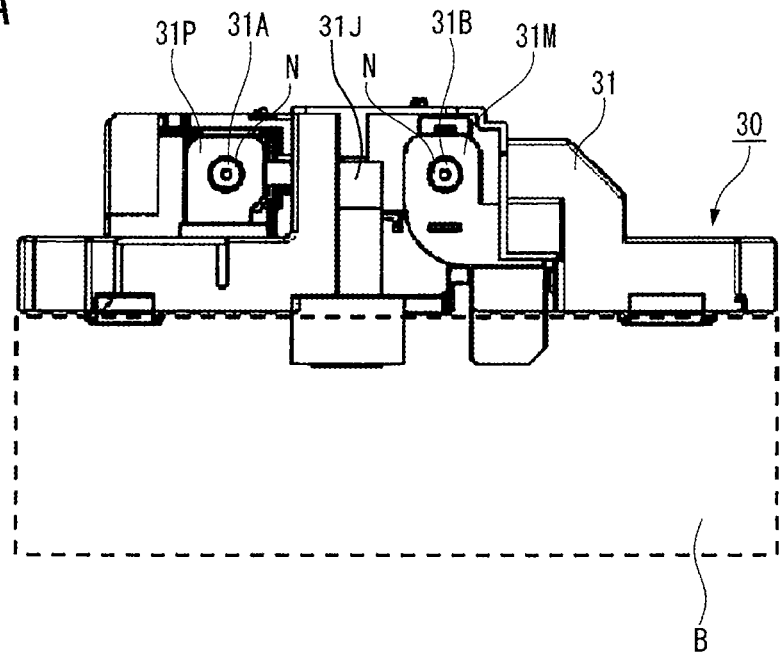
Figure 1B:
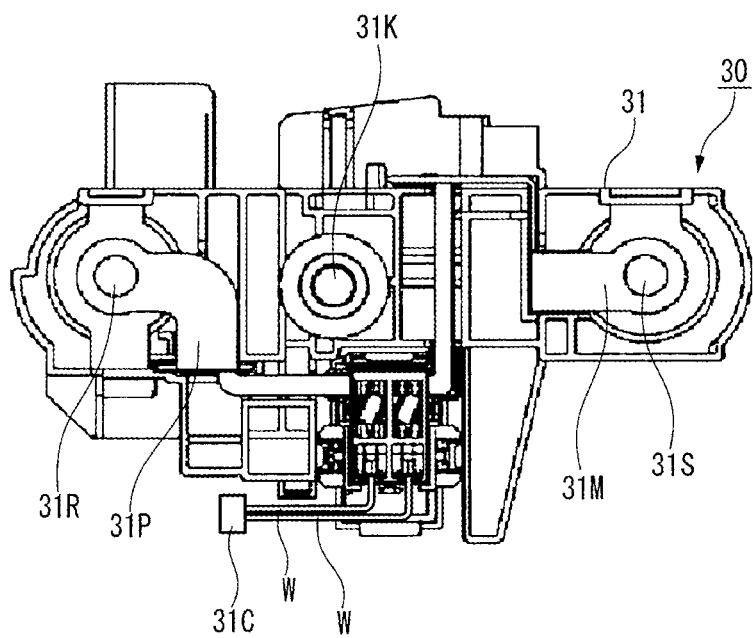
Figure 2A:
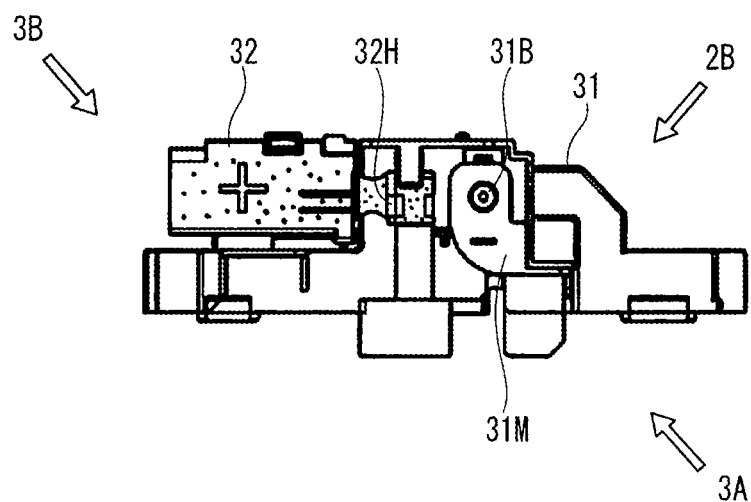
FIG. 2A is a plan view illustrating a state in which a terminal cover is fitted into the terminal block in FIG. 1A, and the terminal cover is closed.
Figure 2B:
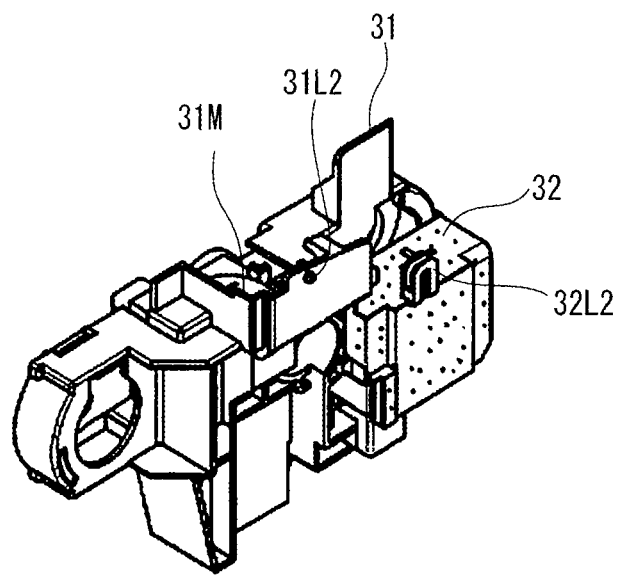
FIG. 2B is a perspective view when seen from a direction indicated by the arrow 2B in FIG. 2A.
Figure 3A:
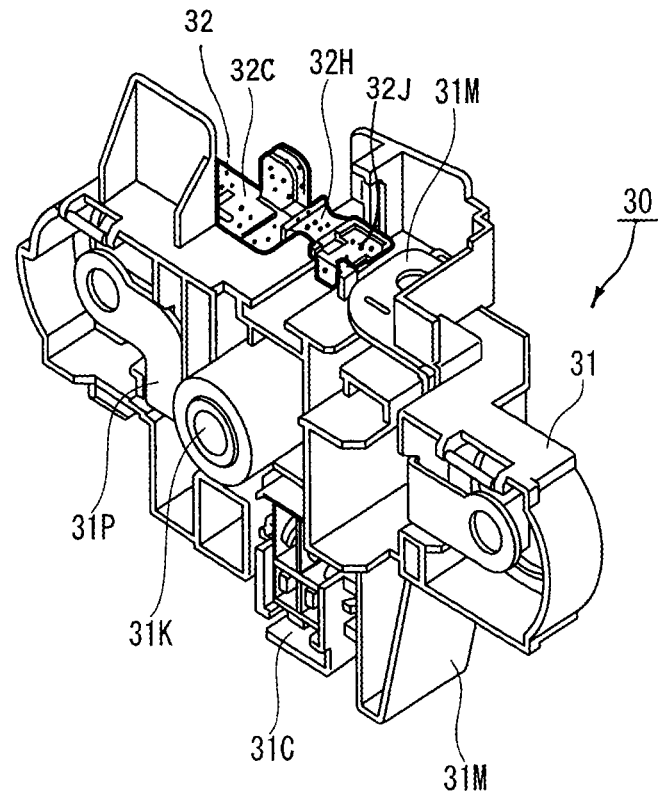
FIG. 3A is a perspective view when seen from a direction indicated by the arrow 3A in FIG. 2A.
Figure 3B:
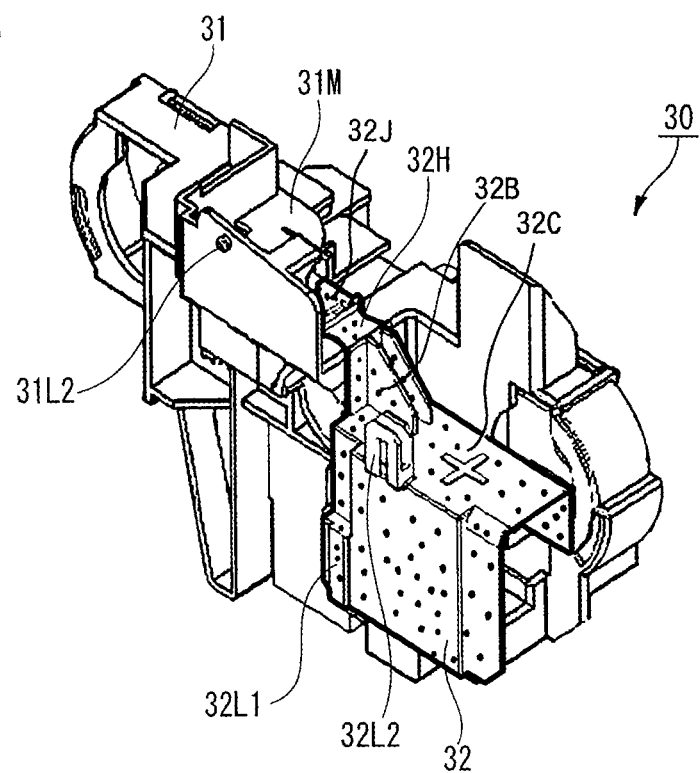
FIG. 3B is a perspective view when seen from a direction indicated by the arrow 3B in FIG. 2A.
Figure 4A:
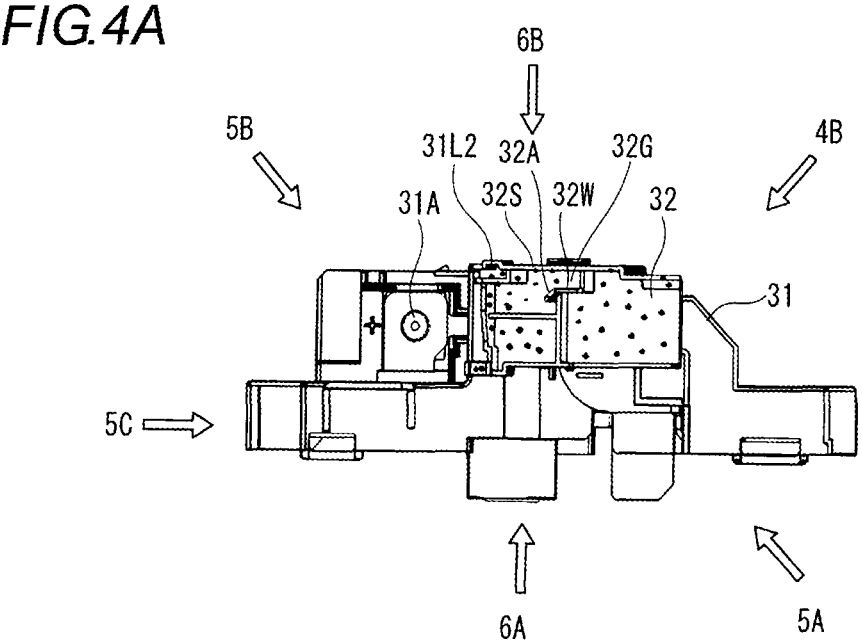
FIG. 4A is a plan view illustrating a state in which a terminal cover is fitted into the terminal block in FIG. 1A, and the terminal cover is opened.
Figure 4B:
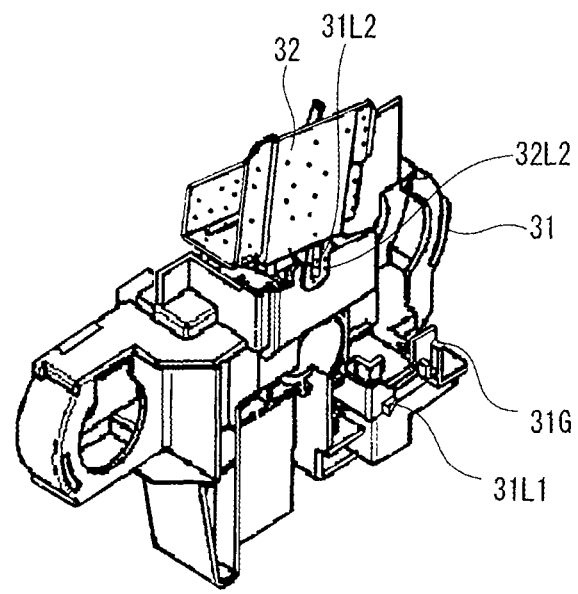
FIG. 4B is a perspective view when seen from a direction indicated by the arrow 4B in FIG. 4A.
Figure 6A:
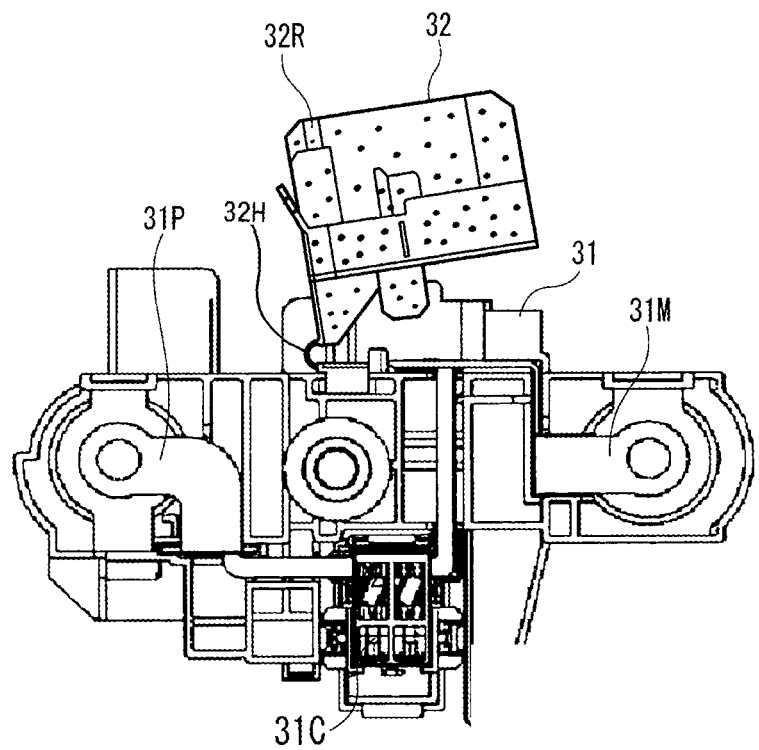
FIG. 6A is a front view when seen from a direction indicated by the arrow 6A in FIG. 4A.
Figure 6B:
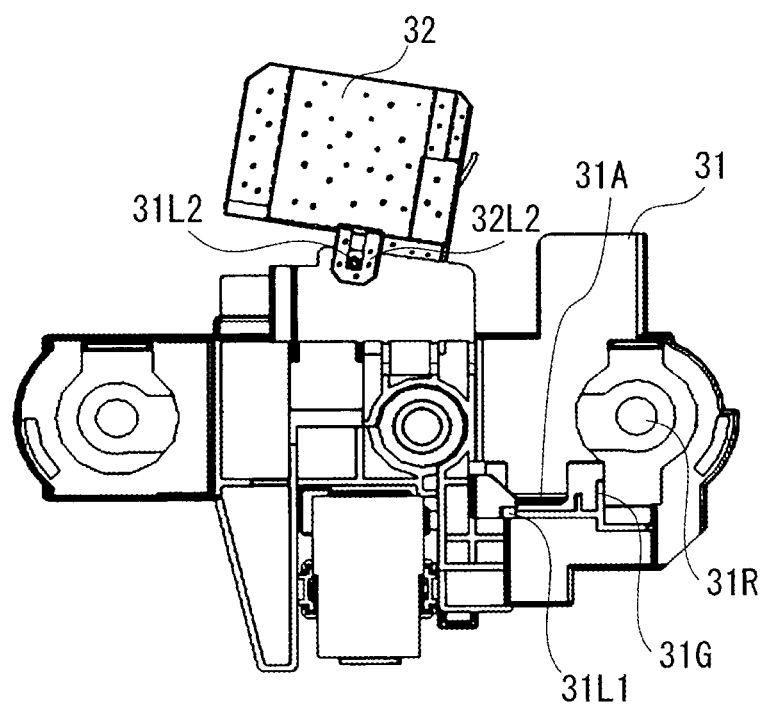
FIG. 6B is a front view when seen from a direction indicated by the arrow 6B in FIG. 4A.

FIGS. 1A and 1B are diagrams illustrating the terminal block for the vehicle-mounted battery assembly from which a terminal cover is removed, in which FIG. 1A is a plan view, and FIG. 1B is a front view. FIGS. 2A to 6B are diagrams illustrating the terminal block for the vehicle-mounted battery assembly in which the terminal cover is fitted into the terminal block. FIGS. 2A to 3B illustrate the state in which the terminal cover is closed, and FIGS. 4A to 6B illustrate the state in which the terminal cover is opened. FIG. 2A is a plan view illustrating the which the terminal cover is fitted into the terminal block, and the terminal cover is closed, and FIG. 2B is a perspective view when seen from a direction indicated by the arrow 2B in FIG. 2A. FIG. 3A is a perspective view when seen from a direction indicated by the arrow 3A in FIG. 2A, and FIG. 3B is a perspective view when seen from a direction indicated by the arrow 3B in FIG. 2A. FIG. 4A is a plan view illustrating a state in which the terminal cover is fitted into the terminal block in FIG. 1A, and the terminal cover is opened, and FIG. 4B is a perspective view when seen from a direction indicated by the arrow 4B in FIG. 4A. FIG. 5A is a perspective view when seen from a direction indicated by the arrow 5A in FIG. 4A, FIG. 5B is a perspective view when seen from a direction indicated by the arrow 5B in FIG. 4A, and FIG. 5C is a perspective view when seen from a direction indicated by the arrow 5C in FIG. 4A. FIG. 6A is a front view when seen from a direction indicated by the arrow 6A in FIG. 4A, and FIG. 6B is a front view when seen from a direction indicated by the arrow 6B in FIG. 4A.

In addition, in the drawings, the terminal cover is attached by a black spot to distinguish a terminal cover 32 and the terminal block body 31.

The terminal block 30 for the vehicle-mounted battery assembly according to the present invention includes the terminal block body 31 and the terminal cover 32. In FIGS. 1A and 1B, the terminal block 31 is equipped with a positive bus bar 31P (FIG. 1B) having one end, in which a voltage of the total positive terminal of the vehicle-mounted battery assembly is applied to a positive-side through-hole 31R (FIG. 1B) formed in the one end, and the other end extending to an external extraction positive-side fastening portion 31A (FIG. 1A), and a negative bus bar 31M (FIG. 1B) having one end, in which a voltage of the total negative terminal of the vehicle-mounted battery assembly is applied to a negative-side through-hole 31S (FIG. 1B) formed in the one end, and the other end extending to an external extraction negative-side fastening portion 31B (FIG. 1A).

In FIGS. 2A and 2B, the terminal cover 32 is molded separate from the terminal block body 31, and prevents a tool from being brought into contact with the external extraction negative-side fastening portion 31B when a wire harness is connected to the external extraction positive-side fastening portion 31A of the terminal block body 31. As a result, when operation for the positive-side fastening portion 31A is carried out, the terminal cover 32 covers the top of the external extraction negative-side fastening portion 31B (see FIGS. 4A to 6B). Also, when operation for the negative-side fastening portion 31B is carried out or is used, the terminal cover 32 is turned on the hinge to cover the top of the external extraction positive-side fastening portion 31A (see FIGS. 2A, 2B, 3A, 3B, 8A and 8B). Accordingly, the external extraction positive-side fastening portion 31A and t he external extraction negative-side fastening portion 31B are not simultaneously exposed.

(Terminal Block Body 31)

The terminal block body 31 will now be described in detail.

Returning to FIG. 1A, since the battery assembly B1 is disposed at the portion, which is enclosed by a dotted line, adjacent to the rear surface of the terminal block body 31, the operation does not start from the portion enclosed by the dotted line. Accordingly, the short-circuit preventing structure is not provided to the rear surface.

In FIG. 1B, the terminal block body 31 is provided at a substantially center portion thereof with a collar 31K which is formed by insert molding. The terminal block body 31 is fixed to the battery side by use of the collar 31K.

The positive bus bar 31P and the negative bus bar 31M embedded in the terminal block body 31 have the following shape.

((Positive Bus Bar 31P))

The positive-side through-hole 31R is penetrated in one end of the positive bus bar 31P, and a bolt is fastened to the through-hole of the bus bar which is laid over the total positive/negative terminal block 20-1 (FIG. 8A). After fastening, a cap is attached to a resin portion of the terminal block body 31 which encloses the positive-side through-hole 31R of the positive bus bar 31P, so that the positive bus bar-side fastening portion and the negative bus bar-side fastening portion are not simultaneously brought into contact with each other.

The positive bus bar 31P is bent downward in the terminal block body 31, and the other end of the positive bus bar reaches the external extraction positive-side fastening portion 31A.

((Negative Bus Bar 31M))

The negative-side through-hole 31S is penetrated in one end of the negative bus bar 31M, and a bolt is fastened to the through-hole of the bus bar which is laid over the total positive/negative terminal block 20-2 (FIG. 1A). The negative bus bar 31M is bent upward in the terminal block body 31, and the other end of the negative bus bar reaches the external extraction negative-side fastening portion 31B.

((External Extraction Positive-Side Fastening Portion 31A and External Extraction Negative-Side Fastening Portion 31B))

The external extraction positive-side fastening portion 31A (FIG. 1A) and the external extraction negative-side fastening portion 31B (FIG. 1A) are provided with a nut N through insert molding, which becomes a fastening portion for extracting the total positive and negative of the battery.

Since the positive bus bar 31P is bent downward and the negative bus bar 31M is bent upward, the external extraction positive-side fastening portion 31A and the external extraction negative-side fastening portion 31B are not formed on the same plane, and a height difference larger than an outer diameter of the collar K occurs, as the present invention.

The reason why the height difference (level split) is provided between the external extraction positive-side fastening portion 31A (FIG. 5B) and the external extraction negative-side fastening portion 31B (FIG. 5A) is that a wiring space of the total positive/negative harness is narrow. It is possible to easily carry out arrangement of wiring by providing the level split.

The present invention is based on the terminal block with the height difference between the external extraction positive-side fastening portion 31A and the external extraction negative-side fastening portion 31B, and looks for measures for preventing the short circuit in such a case.

According to the present invention, the terminal block body 31 is attached by the terminal cover 32 described below so as to prevent the short circuit.

(Terminal Cover 32)

Figure 7:
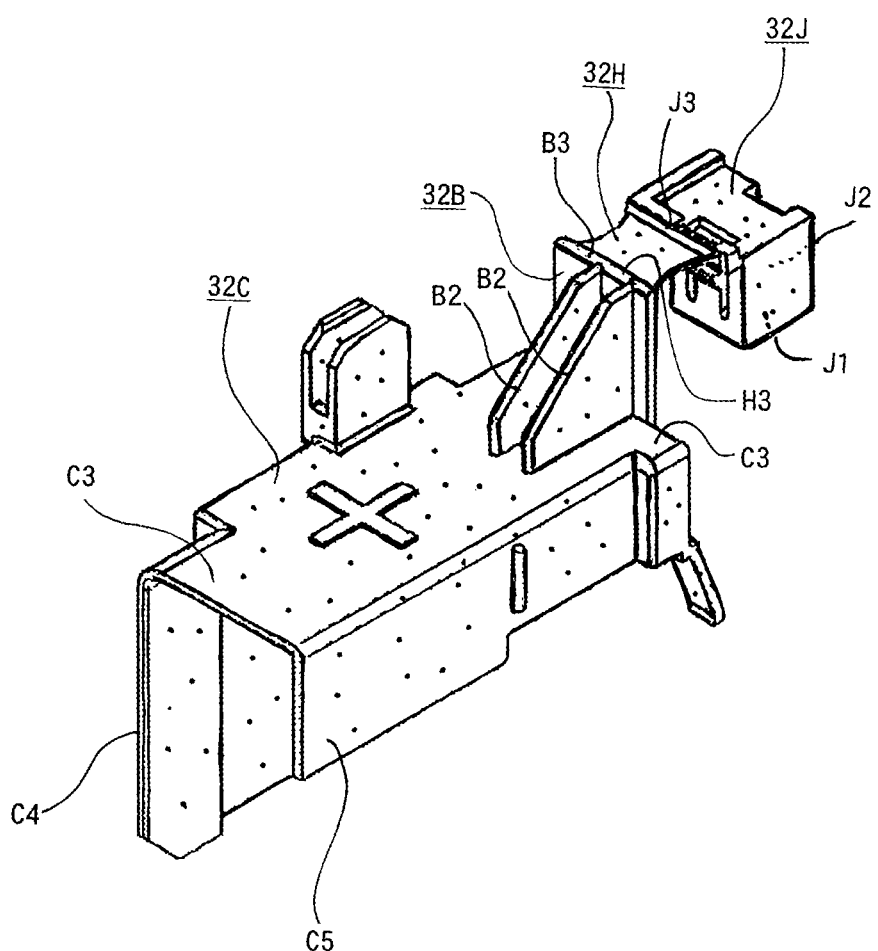
FIG. 7 is a perspective view of the terminal cover according to the present invention.

FIG. 7 is a perspective view of the terminal cover 32 according to the present invention.

In FIG. 7, the terminal cover 32 is a resin molding body integrally formed with a fitting portion 32J fitted into a fitting boss 31J (FIG. 1A) formed on the terminal block body 31 (FIG. 1A), a hinge portion 32H engaged with the fitting portion 32J, an arm portion 32B engaged with the hinge portion 32h, and a cover body 32C engaged with the arm portion 32B.

Accordingly, the fitting portion 32J, the hinge portion 32H, the arm portion 32B, and the cover body 32C will be described in this order.

((Fitting Portion 32J))

The fitting portion 32J is a cubic member having an inner space J2 of a regular hexahedron, with one surface J1 (bottom side in FIG. 7) being opened. At the side of the terminal block body 31, a cubic fitting boss 31J to be fitted into the inner space J2 is formed on a surface, on which the external extraction negative-side fastening portion 31B of the external extraction positive-side fastening portion 31A and the external extraction negative-side fastening portion 31B is installed, at a substantially intermediate position when seen from the plane of the external extraction positive-side fastening portion 31A and the external extraction negative-side fastening portion 31B in FIG. 1A.

Accordingly, the terminal cover 32 is assembled to the terminal block body 31 by inserting the fitting portion 32J of the terminal cover 32 into the fitting boss 31j of the terminal block body 31.

((Hinge Portion 32H))

The hinge portion 32H is a flexible member for coupling one side J3 of the fitting portion 32J to an end portion B3 of the arm portion 32B, and can pivot from a horizontal state (see FIGS. 2A, 2B, 3A, 3B and 7) to a vertical state (see FIGS. 4A to 6B) on the basis of the side J3 of the fitting portion 32J. When the hinge portion 32H is in the horizontal state, the cover body 32C is closed, and when the hinge portion 32h is in the vertical state, the cover body 32C is opened.

((Arm Portion 32B))

Since there is the height difference between the external extraction positive-side fastening portion 31A and the external extraction negative-side fastening portion 31B, the arm portion 32B is installed. Since the hinge portion 32H is in the horizontal state (see FIG. 7) in the state in which the cover body 32C is closed, the length of the arm portion 32B is a distance of a straight line connecting the end portion H3 of the hinge portion 32H in the horizontal state to an upper surface C3 of the cover body 32C in the closed state. Since the arm portion 32B supports the cover body 32C in a cantilever type, the arm portion is provided with ribs B2 for reinforcing the arm portion at two positions.

((Cover Body 32C))

The cover body 32C is a member for covering the external extraction positive-side fastening portion 31A and opening the external extraction negative-side fastening portion 31B at the closed position, and for opening the external extraction positive-side fastening portion 31A and covering the external extraction negative-side fastening portion 31B at the open position. The cover body 32C is connected to the arm portion 32B at one surface thereof The cover body 32C prevents the external extraction positive-side fastening portion 31A and the external extraction negative-side fastening portion 31B from being simultaneously opened in any state of the open and closed positions, thereby preventing the positive and negative terminals from being short-circuited due to the fact that the tool is brought into contact with both terminals at fastening.

If the cover body 32C covers the external extraction positive-side fastening portion 31A and opens the external extraction negative-side fastening portion 31B at the closed position, and opens the external extraction positive-side fastening portion 31A and covers the external extraction negative-side fastening portion 31B at the open position, the shape of the cover body is not specifically limited. For example, the cover body 32C includes an upper cover C3, a front cover C4 and a rear cover C5 which respectively cover an upper surface, a front surface and a rear surface of the external extraction positive-side fastening portion 31A (see FIG. 3B) at the closed position. At the open position, the upper cover C3 covers the upper portion of the external extraction negative-side fastening portion 31B (see FIG. 5A). Since there is little a potential difference between the external extraction negative-side fastening portion 31B and the earth, only the upper cover is sufficient, without covering the front and rear portions.

(Closing Operation of Terminal Cover 32)

To cover the external extraction positive-side fastening portion 31A by the terminal cover 32, as the terminal cover 32 positioned in the open state is held by a hand and is turned in a left side from the drawing, engagement of an engaging frame 32L2 (described later; FIG. 6B) of the terminal cover 32 and a boss 31L2 of the terminal block body 31 is released, so that the cover body 32C is turned in a counterclockwise direction. The hinge portion 32H is also is turned, and thus the cover body 32C is finally in the horizontal state (see FIGS. 2A to 3B) to cover the external extraction positive-side fastening portion 31A. In this instance, the engaging portion 32L1 of the terminal cover 32 which will be described later is engaged with the tapered boss 31L1 of the terminal block body 31, and then the terminal cover 32 is maintained in the closed state in which the terminal cover closes the terminal block body 31.

(Opening Operation of Terminal Cover 32)

To cover the top of the external extraction negative-side fastening portion 31B by opening the terminal cover 32 from the external extraction positive-side fastening portion 31A, as the terminal cover 32 positioned at the closed position (FIG. 3B) is held by the hand and is put up in the drawing, the engagement of the engaging portion 32L1 of the terminal cover 32 and the tapered boss 31L1 (described later, FIG. 4B) of the terminal block body 31 is released, so that the cover body 32C is turned upward in the drawing. The hinge portion 32H is also turned, and the arm portion 32B stands upright and remains stationary. Accordingly, the cover body 32C supported by the arm portion 32B covers the top of the external extraction negative-side fastening portion 31B (see FIGS. 5A to 5C).

In this instance, the engaging frame 32L2 of the terminal cover 32 is engaged with the boss 31L2 of the terminal block body 31, and then the terminal cover 32 is still maintained in the state in which the terminal cover opens (is vertical to) the terminal block body 31.

The terminal block body 31 and the terminal cover 32 are respectively provided with a first lock function for maintaining the terminal cover 32 in the closed state, and a second lock function for maintaining the terminal cover 32 in the open state.

((First Lock Function))

When the terminal cover 32 is in the closed state (FIG. 2B), the first lock function is provided to maintain the terminal cover 32 in this state. Specifically, when the terminal cover 32 is in the closed state (FIG. 2B), the portion of the terminal block body 31 which is covered by the end portion of the terminal cover 32 is provided with the tapered boss 31L1 (FIG. 5B), and the portion of the terminal cover 32 which is opposite to the tapered boss 31L1 is provided with the engaging portion 32L1 (FIG. 5B) which is inserted into the tapered boss 31L1. When the terminal cover 32 is turned around the hinge portion 32H (FIG. 5B) and thus is changed from the state in FIG. 5B to the state in FIG. 3B, the engaging portion 32L1 of the terminal cover 32 abuts against the taper of the tapered boss 31L1 of the terminal block body 31. The terminal cover 32 moves and sits on the taper by the elasticity of the resin material thereof, and then the engaging portion 32L1 of the terminal cover 32 is finally engaged with the tapered boss 31L1 of the terminal block body 31. After that, the terminal cover 32 is maintained in the state in which the terminal cover closes the terminal block body 31.

((Second Lock Function))

When the terminal cover 32 is in the open state (FIG. 5B), the second lock function is provided to maintain the terminal cover 32 in this state. Specifically, the terminal block body 31 is provided with the boss 31L2 (FIGS. 2B and 3B). When the terminal cover 32 is turned around the hinge portion 32H (FIG. 3B) and thus is changed from the state in FIG. 3*b* to the state in FIG. 5B, the engaging frame 32L2 (FIGS. 2B and 3B) of the terminal cover 32 abuts against the boss 31L2 of the terminal block body 31. The terminal cover 32 sits on the boss 31L2 by the elasticity of the resin material thereof, and then the engaging frame 32L2 of the terminal cover 32 is finally engaged with the boss 31L2 of the terminal block body 31. After that, the terminal cover 32 is maintained in the state in which the terminal cover opens the terminal block body 31.

(Rattling Prevention Function)

When the terminal cover 32 is in the closed position, the terminal block body 31 and the terminal cover are respectively provided with a rattling prevention function of preventing the terminal cover 32 from rattling on the terminal block body 31. Explaining the rattling prevention function in detail, the terminal block body 31 is provided with a pressed member 31G (FIGS. 4B and 5B) having a predetermined width in a direction crossing a turning direction of which the terminal cover 32 is turned around the hinge portion 32H (FIG. 3B), and the pressed member 31G is made from a resin material. The terminal cover 32 is provided with press-in groove 32G (FIGS. 4A and 5A) which is formed by a lateral wall 32S (FIG. 4A) and an intermediate wall 32W (FIGS. 4A and 5A). When the terminal cover 32 is turned around the hinge portion 32H, the pressed member 31G is inserted in the press-in groove 32G in a press-fitting state. A portion of the intermediate wall 32W in vicinity of an entrance of the press-in groove 32G has a guide portion 32A (FIG. 4A), of which a width is wider as it comes close to the entrance. The pressed member 31G is easily fitted by the guide portion 32A.

(Process of Assembling and Mounting Terminal Block for Vehicle-Mounted Battery Assembly of the Present Invention)

Next, a process of assembling and mounting the terminal block for the vehicle-mounted battery assembly of the present invention will now be described.

(1) First, in the open state (FIGS. 4A to 6B), the terminal cover is attached to the battery B1 by fastening the portions of the collar 31K of FIG. 1B, the positive-side through-hole 31R, and the negative-side through-hole 31S.

(2) The cap is attached to the resin portion of the terminal block body 31 enclosing the positive-side through-hole 31R.

(3) The portion of the external extraction positive-side fastening portion 31A is fastened.

(4) The terminal cover 32 is closed in the state of FIGS. 2A to 3B, and then the portion of the external extraction negative-side fastening portion 31B is fastened.

In this way, it is possible to prevent the positive and negative terminals from being simultaneously brought into contact with each other at the place where the cap or the slide cover is hard to be attached, in view of layout.

Also, the selection (positive or negative side) of the fastened portion can be carried out by use of only one part of the terminal cover.

What is claimed is:

1. A terminal block for a vehicle-mounted battery assembly, the terminal block being attached to a total positive/negative terminal block which is attached to the vehicle-mounted battery assembly, the terminal block comprising:

an external extraction positive-side fastening portion and an external extraction negative-side fastening portion which are positioned at different heights; and a terminal cover configured to cover the external extraction positive-side fastening portion, wherein the terminal cover includes a fitting portion fitted into the terminal block for the vehicle-mounted battery assembly, a hinge portion engaged with the fitted portion, an arm portion engaged with the hinge portion, and a cover body engaged with the arm portion, and the arm portion has a predetermined length, so that by hinge operation of the hinge portion, the cover body covers both the external extraction positive-side fastening portion and the external extraction negative-side fastening portion which are positioned at different heights.

2. The terminal block for the vehicle-mounted battery assembly according to claim 1, wherein the terminal block for the vehicle-mounted battery assembly and the terminal cover are respectively provided with a first lock function for locking the terminal cover in a state in which the terminal cover covers the external extraction positive-side fastening portion, and a second lock function for locking the terminal cover in a state in which the terminal cover covers the external extraction negative-side fastening portion.

3. The terminal block for the vehicle-mounted battery assembly according to claim 1, wherein the terminal block for the vehicle-mounted battery assembly and the terminal cover are respectively provided with a rattling prevention function of preventing rattling of the terminal cover in a state in which the terminal cover covers the external extraction positive-side fastening portion.

4. The terminal block for the vehicle-mounted battery assembly according to claim 1, wherein the terminal cover does not cover both the external extraction positive-side fastening portion and the external extraction negative-side fastening portion at the same time.

5. The terminal block for the vehicle-mounted battery assembly according to claim 1, wherein the terminal cover body moves between a first position where the external extraction positive-side fastening portion is covered with the cover body and a second position where the external extraction negative-side fastening portion is covered with the cover body, by the hinge operation of the hinge portion, thereby selectively covering the external extraction positive-side fastening portion or the external extraction negative-side fastening portion with the cover, and wherein the first position is different from the second position.

* * * * *